United States Patent
Chen

(10) Patent No.: US 7,916,382 B2
(45) Date of Patent: Mar. 29, 2011

(54) SCRATCH AND MAR RESISTANT PDLC MODULATOR

(75) Inventor: Xianhai Chen, San Jose, CA (US)

(73) Assignee: Photon Dynamics, Inc., San Jose, CA (US)

( * ) Notice: Subject to any disclaimer, the term of this patent is extended or adjusted under 35 U.S.C. 154(b) by 386 days.

(21) Appl. No.: 11/719,087

(22) PCT Filed: Nov. 9, 2005

(86) PCT No.: PCT/US2005/042117
§ 371 (c)(1),
(2), (4) Date: Mar. 12, 2008

(87) PCT Pub. No.: WO2006/053344
PCT Pub. Date: May 18, 2006

(65) Prior Publication Data
US 2008/0206489 A1    Aug. 28, 2008

(51) Int. Cl.
*G02F 1/00* (2006.01)
(52) U.S. Cl. ........................ 359/321; 359/322
(58) Field of Classification Search .......... 359/321, 359/322, 290–292
See application file for complete search history.

(56) References Cited

U.S. PATENT DOCUMENTS

| | | | | |
|---|---|---|---|---|
| 4,738,880 A * | 4/1988 | Asada et al. | ................ | 428/1.32 |
| 7,099,067 B2 | 8/2006 | Chen | | |
| 7,452,961 B2 * | 11/2008 | Ueda et al. | .................. | 528/377 |
| 2005/0077005 A1 | 4/2005 | Chen et al. | | |

FOREIGN PATENT DOCUMENTS

| | | | |
|---|---|---|---|
| JP | 2002-216401 | * | 1/2001 |
| JP | 2002-216401 A | | 8/2002 |

* cited by examiner

*Primary Examiner* — David N Spector
*Assistant Examiner* — Brandi N Thomas
(74) *Attorney, Agent, or Firm* — Townsend and Townsend and Crew LLP

(57) ABSTRACT

A PDLC modulator is fabricated using at least one of a selection of specially-formulated UV curable organic hard coatings as a protective layer on the exposed side of polyester (Mylar) film. The hard coatings of various related types show good adhesion on a polyester film substrate, superior hardness and toughness, and have a slippery top surface, which minimizes unnecessary wear. The coating as applied on the modulator surface significantly reduces scratch damage on modulators caused by unexpected particles on the panels under test. In addition, the slip surface will reduce stickiness to particles and therefore also reduce the possibility of panel damage.

17 Claims, 1 Drawing Sheet

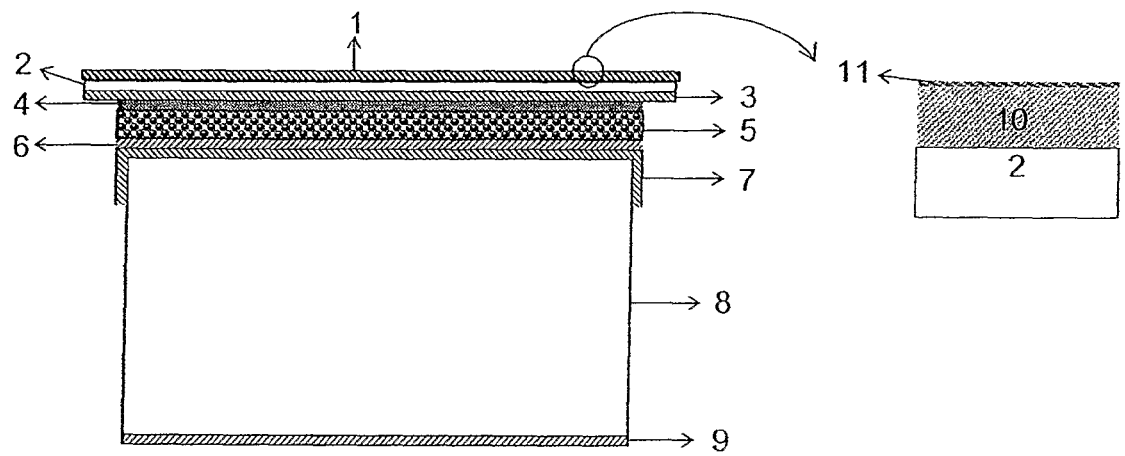
FIGURE 1A
FIGURE 1B
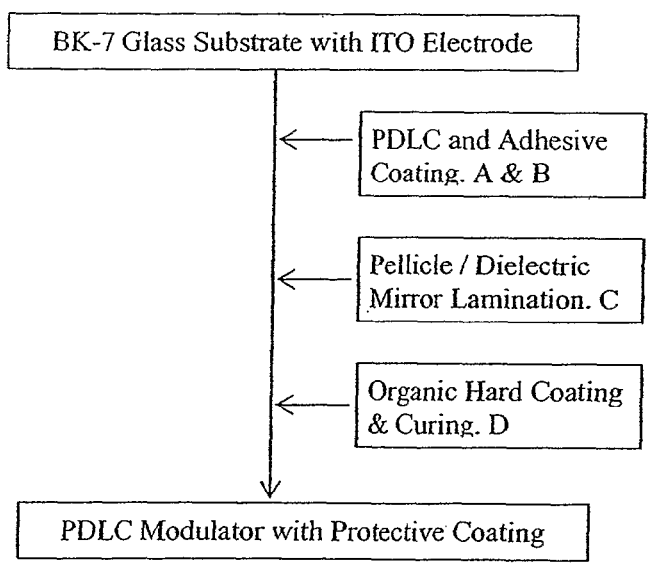
FIGURE 2

SCRATCH AND MAR RESISTANT PDLC MODULATOR

CROSS-REFERENCES TO RELATED APPLICATIONS

This application is a non-provisional application under 35 U.S.C. §371, which claims priority from PCT Application No. PCT/US2005/042117 filed on 9 Nov. 2005, and published as WO 2006/053344 on 18 May 2006, which claims priority from U.S. patent application Ser. No. 10/986,425, filed on Nov. 10, 2004, now U.S. Pat. No. 7,099,067, the full disclosures of which are incorporated herein by reference.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to liquid crystal modulators and more particularly to polymer dispersed liquid crystal (PDLC) modulator structures. (PDLC may be a mixture of hydroxyl polyacrylate with the TL-series of liquid crystal, where the hydroxyl group is crosslinked by polyisocyanate).

PDLC modulators are used to test thin film transistors in the liquid crystal display (LCD) industry. Modulator lifetime improvement is one of the major objectives in PDLC modulator research and development. Due to the close proximity of components relative to panels under test, PDLC modulator structures are subject to damage in normal use, which severely curtails useful life.

An existing 131 mm square PDLC modulator build on BK-7 optical glass is known wherein the active surface is protected by a thin film (about 6 μm) of polyester (such as Mylar film from Dupont of Wilmington, Del.). Due to the softness of the polyester film, its surface is prone puncture and scratch damage, so that the modulator lifetime has become an issue. The major modulator damage modes include 1) pellicle peeling, 2) particle penetration, and 3) scratching. These damage modes render the modulators useless after relatively short periods of time. As use of PDLC modulators increases, it has become urgent to develop a more robust modulator structure.

Prior solutions have been developed which have proved inadequate. Two specific modes of interest are:

Mechanical Polishing of Glass. This technique involves deposition of dielectric mirror material onto a glass substrate. The glass was then laminated onto NCAP (nematic curvilinear aligned phase) material with the mirror coating in a sandwich contact with the NCAP material. The glass is then mechanically polished back, leaving a very thin structure. The resulting thin film shows weak mechanical strength (which is thus easy to break) when the finished modulator is used in an applicable system.

Direct Dielectric Mirror Coating. In this technique, dielectric mirror material is deposited by physical vapor deposition directly onto NCAP or PDLC material. While this approach could potentially provide a hard but thin surface on the top of modulator, no data related to modulator durability is available. Moreover, attempts at fabricating such a structure have faced technical challenges, including poor yield.

What is needed is a dielectric-based PDLC modulator that is resistant to damage and a method of manufacture.

SUMMARY OF THE INVENTION

According to the invention, a PDLC modulator is fabricated using at least one of a selection of specially-formulated UV curable organic hard coatings as a protective layer on the exposed side of polyester (Mylar) film. The hard coatings of various related types show good adhesion on a polyester film substrate, superior hardness and toughness, and have a slippery top surface, which minimizes unnecessary wear. The coating as applied on the modulator surface significantly reduces scratch damage on modulators caused by unexpected particles on the panels under test. In addition, the slip surface will reduce stickiness to particles and therefore also reduce the possibility of panel damage.

The invention will be better understood by reference to the following detailed description in connection with the accompanying drawings.

BRIEF DESCRIPTION OF THE DRAWINGS

FIGS. 1A and 1B are a side cross-sectional view (not to scale) of a PDLC-based modulator head according to the invention.

FIG. 2 is a flow chart of the fabrication process according to the invention.

DETAILED DESCRIPTION OF THE INVENTION

In accordance with the invention, UV curable organic hard coatings have been formulated and applied as a protective layer on the surface of electro-optical modulators. The coatings show good adhesion to plastic (Mylar) substrate, $\geq 3$ H hardness, superior toughness and slippery top surface.

As shown in FIG. 1A and in greater detail in FIG. 1B, an organic hard coating 1 is placed on an otherwise finished modulator. The organic hard coating 1 comprises a major hard coating 10, has over it a much thinner slip agent layer 11. Specifically, the coating 1 is applied to a polyester film (such as Mylar) 2, which in turn covers and protects a fragile dielectric mirror 3 that is held in place by a water-borne adhesive layer 4 upon the surface of a PDLC layer 5. An insulative layer 6 of silicon dioxide ($SiO_2$) separates the PDLC layer 5 from a transparent electrode 7 of indium tin oxide (ITO) on a glass substrate 8, which is typically BK-7 type optical glass. An antireflective coating 9 on the opposing side of the substrate 8 rounds out the structure of the modulator head as improved.

Organic Hard Coating Formulation and Process:

A special formulation of the organic hard coating 1 constitutes a specific embodiment of the invention. The organic hard coating formulation contains (Trademarks and brand names capitalized):

1) 10%~50% epoxy acrylate, such as type CN-104 (Sartomer Company, Inc., Exton, Pa.), CN-120 (Sartomer), CN-124 (Sartomer), Ebecryl-600 (Surface Specialties, formerly of UCB Chemicals of Brussels, Belgium, now of Cytec Industries of West Patterson, N.J.), or like epoxy acrylate;

2) 0%~30% multifunctional urethane acrylate such as Ebecryl-4827 (Surface Specialties), CN975 (Sartomer);

3) 10%~50% multi-functional monomer, such as SR-399 (Sartomer);

4) 0%~5% adhesion promoter, such as Ebecryl-168 (Surface Specialties), Ebecryl-170 (Surface Specialties), CD-9052, SR-9009, SR-9011, and SR-9012 (Sartomer);

5) 0.5%~5% silicone acrylate slip agent, such as Ebecryl-350, and Ebecryl-1360 (Surface Specialties);

6) 0%~15% low viscosity diacrylate monomer, such as SR-238 (Sartomer);

7) 0~40% low viscosity triacrylate such as OTA-480 (Surface Specialties);

8) 0~10% crosslinkable toughening agent, such as Ricacryl 3100, Ricacryl 3500, Ricacryl 3801 (Ricon Resins, Inc., Grand Junction, Colo.), Hycar VTBNX 1300×33, and Hycar VTBNX 1300×43 (BF Goodrich, Akron, Ohio), etc.;

9) 0.05~5% photo-initiators, such as Irgacure-369 (Ciba Specialty Chemicals, Tarrytown, N.Y.), Irgacure-500 (Ciba), Irgacure-907 (Ciba), SR-1124 (Sartomer), or their combinations.

The hardness and scratch/mar resistances are further improved by combining the above organic hard coating with up to 70% (based on total solids) inorganic fillers such as MEK-ST and MIBK-ST (Nissan Chemical Industries, Tokyo, Japan). 0.5~5% of silane, such as Silquest A-174, A-1120 (GE Silicones—OSI Specialties, Paris, France) is added to promote the interfacial adhesion between organic resin and inorganic filler.

A solvent such as methyl isobutyl ketone is added to have solid content between 30~60%.

The above formulation is then coated on the polyester (such as Mylar from Dupont of Wilmington, Del.) surface on top of the modulator by using a doctor blade, wire wound rod or spinner, or the like. Spin coating is preferred, since it yields a favorable coating thickness uniformity. The coating thickness is controlled at 3~15 microns by solid content of formulation and/or spinning speed. After complete solvent evaporation, the coating is cured under UV irradiation.

Properties of the Organic Hard Coating:

The properties of the organic hard coating according to the invention are as follows:

Improved Surface Hardness and Mar Resistance. Highly crosslinked organic coating can easily reach 5 H pencil hardness if it is coated on hard substrates such as glass. ≧3 H pencil hardness can be reached on Mylar, which only has ~HB pencil hardness itself. The coating is softer than thin film transistor (TFT) panel so that the modulator will not damage the panel in case the modulator touches the panel.

Improved Scratch Resistance. Modified by a crosslink-able slip agent on the very top surface, its friction to unexpected particles is significantly reduced. This will also potentially reduce the possibility of picking up the particles.

Thin Coating. Thicker coating has better scratch resistance and mar resistance. However, the thickness will affect the modulator sensitivity and/or air gap. The current invention preferably uses 1~20 μm, more preferably 3~10 μm thick hard coating. The modulator sensitivity or air gap tradeoff is negligible.

Good Adhesion on Mylar. The U-V curable coatings in this invention have strong adhesion on Mylar surface. The adhesion can be further improved by adding adhesion promoters.

Toughness. By adding crosslinkable toughening additives, the highly crosslinked organic coating shows superior toughness and flexure resistance.

Low Dielectric Constant. The dielectric constants of the organic and organic/inorganic hybrid hard coatings are in the range of 2.5~5, which has negligible effect on the spatial resolution.

Solvent Resistance. Since the organic coating is highly crosslinked, it shows superior resistance to common solvents such as acetone, isopropanol, and methyl ethyl ketone, etc. used for modulator cleaning.

1 Coating, "2-Layer" Structure. The formulations contain a slip agent. After coating, the slip agent stays at the top surface due to its low surface tension, as shown in FIG. 1.

Fabrication Procedure of PDLC Modulator with Organic Hard Coating

Referring to FIG. 2, which is a partial process flow chart, the fabrication procedure is as follows:

Step A: PDLC Formulation. 7.54 g of Paraloid AU1033 (Rohm and Haas Coatings of Philadelphia, Pa.), 8.10 g of TL-205 liquid crystal, 5.30 g of methyl isobutyl ketone, and 0.66 g of Desmodur N-75 (Bayer AG, Munich, Germany) are added in a glass vial and stirred overnight. 0.1% of Metacure T-12 catalyst (Air Products and Chemicals, Lehigh Valley, Pa.) (based on total formulation) is then added into the homogeneous mixture and stirred for another 10 minutes.

Step B: PDLC/Adhesive Spin Coating and Pellicle Vacuum Lamination. The mixture prepared in Step 1 is filtered with 1 micron polytetrafluoroethylene (PTFE) filter and spin coated onto a 135.5×135.5 mm square ITO glass substrate. The thickness of PDLC coating layer is controlled at ~17-18 microns by spinning recipe. A thin layer (~1 micron) of Neorez R-967 adhesive (Neoresins, Inc., of Waalwijk, The Netherlands) is coated on top of the PDLC coating, and the two-layer coating is laminated with the dielectric mirror (on a 6 μm Mylar support, "pellicle").

Step C: Hard Coating Formulation preparation. The components are added and mixed homogeneously in an amber glass bottle. Formulation Examples are shown in Table 1.

TABLE 1

UV Curable Hard Coating Formulation Examples (values in grams)

| | 1 | 2 | 3 | 4 | 5 | 6 |
|---|---|---|---|---|---|---|
| CN-104 | 25 | 25 | 25 | 16.7 | 16.7 | 16.7 |
| SR-399 | 30 | 30 | 30 | 20 | 20 | 20 |
| OTA-480 | 40 | 40 | 40 | 26.7 | 26.7 | 26.7 |
| Ebecryl-1360 | 2 | 2 | 2 | 1 | 1 | 1 |
| Methyl Isobutyl Ketone | 80 | 80 | 80 | 53.3 | 53.3 | 53.3 |
| SR-9012 | | 5 | 5 | | | |
| Ricacryl-3500 | | | 10 | | | 5 |
| MIBK-ST | | | | 60 | 60 | 60 |
| Silquest-174 | | | | | 1 | 1 |
| Irgacure-907 | 2 | 2 | 2 | 1 | 1 | 1 |
| Irgacure-500 | 3 | 3 | 3 | 3 | 3 | 3 |

Step D: Organic Hard Coating Process. The formulation from Step 3 is then filtered by 5 μm filter, spin coated on top of modulator pellicle at 700 RPM for 90 s, and then fully cured by UV irradiation. The dry film thickness of hard coating is about 5~6 μm.

The modulators with organic hard coating showed harder/smooth/slippery surface, significant improved durability, and negligible defect detection sensitivity tradeoff.

The invention has been explained with reference to specific embodiments. Other embodiments will be evident to those of ordinary skill in the art. It is therefore not intended that the invention be limited except by the appended claims.

What is claimed is:

1. A method for fabricating a liquid crystal modulator comprising:

applying a liquid crystal material on an optical block substrate;

laminating a dielectric mirror/pellicle over the liquid crystal material; and coating the polyester surface with a UV curable organic coating; and UV curing the curable organic coating to an organic hard coating, wherein the organic hard coating comprises a low dielectric constant within a range from about 2.5 to about 5.

2. The method according to claim 1 wherein the liquid crystal material is coated directly on the optical block substrate.

3. The method according to claim 1 further including formulating the UV curable organic coating as a mixture of multi-functional acrylates, silicone acrylate as a slip agent, and photo-initiators.

4. The method according to claim 1 further including formulating the UV curable organic coating as a mixture of multi-functional acrylates, silicone acrylate as a slip agent, a crosslinkable adhesion promoter, and photo-initiators.

5. The method according to claim 1 further including formulating the UV curable organic coating as a mixture of multi-functional acrylates, the silicone acrylates as a slip agent, a crosslinkable adhesion promoter, a (meth)acrylate terminated toughener, and photo-initiators.

6. The method according to claim 1 further including formulating the UV curable organic coating as a mixture of multi-functional acrylates, silicone acrylate as a slip agent, a (meth)acrylate terminated toughener, nano sized silica as an inorganic filler, and photo-initiators.

7. The method according to claim 1 further including formulating the UV curable organic coating as a mixture of multi-functional acrylates, silicone acrylate as a slip agent, a (meth)acrylate terminated toughener, nano sized silica as inorganic filler, a silane coupling agent, and photo-initiators.

8. The method according to claim 1 wherein the liquid crystal material comprises a formulation of polymer and liquid crystal.

9. The method according to claim 1 further comprising coating a water borne adhesive over the liquid crystal material, and wherein the mirror/pellicle is laminated over the liquid crystal material.

10. An electro-optical modulator with a protective coating, said modulator comprising:
    a liquid crystal material on an optical block substrate;
    a dielectric mirror/pellicle laminated on top of an adhesive layer; and
    a cured UV curable organic hard coating on the pellicle, wherein the cured UV curable organic hard coating comprises a low dielectric constant within a range from about 2.5 to about 5.

11. The modulator according to claim 10 wherein the UV curable organic coating is a mixture of multi-functional acrylates, silicone acrylate as a slip agent, and photo-initiators.

12. The modulator according to claim 10 wherein the UV curable organic coating is a mixture of multi-functional acrylates, silicone acrylate as a slip agent, a crosslinkable adhesion promoter, and photo-initiators.

13. The modulator according to claim 10 wherein the UV curable organic coating is a mixture of multi-functional acrylates, silicone acrylate as a slip agent, a crosslinkable adhesion promoter, a (meth)acrylate terminated toughener, and photo-initiators.

14. The modulator according to claim 10 wherein the UV curable organic coating is a mixture of multi-functional acrylates, silicone acrylate as a slip agent, a (meth)acrylate terminated toughener, nano sized silica as an inorganic filler, and photo-initiators.

15. The modulator according to claim 10 wherein the UV curable organic coating is a mixture of multi-functional acrylates, silicone acrylate as a slip agent, a (meth)acrylate terminated toughener, nano sized silica as inorganic filler, a silane coupling agent, and photo-initiators.

16. The modulator according to claim 10 wherein the liquid crystal material comprises a formulation of polymer and liquid crystal.

17. The modulator according to claim 10, further comprising a water borne adhesive coated over the liquid crystal material.

* * * * *